June 29, 1965 W. H. WEST 3,192,500

SAFETY FASTENING MEANS

Original Filed Jan. 5, 1961

INVENTOR.
Wilson H. West
BY
His Attorney

United States Patent Office 3,192,500
Patented June 29, 1965

3,192,500
SAFETY FASTENING MEANS
Wilson H. West, Royal Oak, Mich., assignor to General Motors Corporation, Detroit, Mich., a corporation of Delaware
Original application Jan. 5, 1961, Ser. No. 80,915. Divided and this application Jan. 16, 1964, Ser. No. 338,207
3 Claims. (Cl. 339—91)

This invention relates to fastening means, and particularly, to safety measures to assure against accidental separation of components that are used on a vehicle having power actuated accessories and the like to be reliably energizable at all times.

This is a diviion of cop-pending application S.N. 80,915—West, filed January 5, 1961.

An object of this invention to provide new and improved safety fastening means on connectors for easy assemblying and positive retention.

Another object of this invention is to provide safety fastening means to retain male and female connector components together, though permitting easy assembly and snap action to aid in making a blind assembly in limited space such as to avoid complaints on power window failures at locations enclosed in doors and quarter panels of vehicles where removal of trim pads is a problem to provide access to the male and female connector components.

Another object of this invention is to provide fastening of telescoping as well as mating connector components by use of a spring clip retainer means having a deflectable projecting portion extending from a connector straddling primary mounting portion and adapted to provide positive indication of assembly and retention as a substantially V-shaped end of the projecting portion snaps into predetermined position with respect to a secondary connector component.

Further objects and advantages of the present invention will be apparent from the following description, reference being had to the accompanying drawings wherein preferred embodiments of the present invention are clearly shown.

Figures 1, 2:
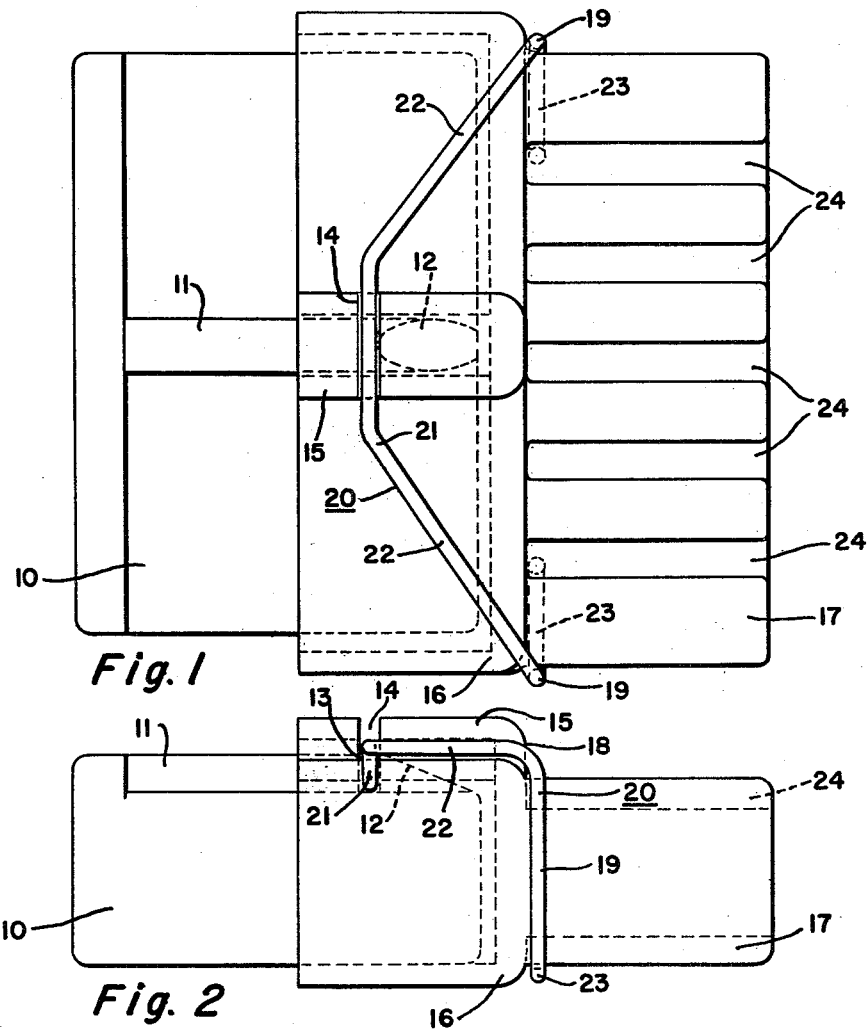
FIGURE 1 shows a top view of safety fastening means to retain male and female connector components together in accordance with the present invention.
FIGURE 2 is a side view of the fastening means and connector components of FIGURE 1.

During mass production manufacture of vehicle bodies there is a progressive assembly of parts and components some of which become difficult to reach for servicing once a vehicle is completed. In recent years there has been an increased provision of power-operated accessories and the like requiring reliability in operation to assure customer satisfaction and to avoid possible inconvenience. An example of such power-operated accessories can be found in window actuators installed to be reciprocable in vehicle doors and panels in accordance with selective energization of actuators either by passengers or a vehicle operator having access to switch means such as disclosed in a patent, 2,919315—Woofter, belonging to the assignee of the present invention. Installation of interior trim along doors and quarter panels of a vehicle as disclosed in co-pending application S.N. 2,383 filed January 14, 1960, now Patent 3,054,213—Mathues, issued to the assignee of the present invention on September 18, 1962, can result in difficulty and limitation in access to connections between control switch means and a power window actuator, for example. Removal of upholstery and trim components can prove expensive and time consuming particularly when accidental separation of mating and telescoping components occurs to result in a break or loose connection either due to faulty initial installation or due to shocks and vibrations encountered during use of a vehicle subject to various road conditions as well as repeated opening and shutting of a door. Sometimes a vehicle door is inadvertently slammed shut and unknowingly a separation of connection components can occur to interrupt supply of power to window actuators such that servicing is required before a window can be opened or shifted to a closed position for locking a vehicle when it is to be left unattended. Connector components can be fitted with terminal means such as disclosed in Patent 2,682,038—Johnson, belonging to the assignee of the present invention but forming no part of the present invention. It is to be understood that any suitable terminals can be mounted for mating inside connector components provided with safety fastening means in accordance with the present invention. FIGURES 1 and 2 illustrate a male connector component 10 of insulating material having a rib 11 extending longitudinally along one side thereof. The rib 11 terminates at one end adjacent to an inclined abutment 12 to form a cut-out groove or slot 13 in a predetermined location complementary to a cut-out or slot 14 extending laterally inwardly along a channel portion 15 integral with a female connector component 16. The female connector component 16 has an integral longitudinally extending body portion 17 smaller in size so as to provide a shoulder 18 against which a connector-straddling primary mounting portion 19 of safety fastening means generally indicated by numeral 20 can be fitted. In addition to the connector-stradding primary mounting portion 19 the fastening means 20 includes a substantially V-shaped end 21 integral with a bent over resilient or spring-like deflectable projecting portion 22. Transverse relationship of the deflectable projecting portion 22 and ends 23 both joined to mounting portion 19 on each of opposite sides of the fastening means 20 assures positive positioning of the fastening means with respect to the female connector component 16 such that the V-shaped end 21 can be snap fitted over the inclined abutment 12 into locking engagement with the alignable slots or cut-outs 13–14 of the male and female connector components, respectively. The female connector component can be provided with a plurality of recesses 24 to aid in gripping the connector components particularly when the deflectable portion 22 is dislocated upwardly by fingers or suitable tool means such as a screwdriver for effecting disengagement of the V-shaped end 21 from the slot 13 between the rib 11 and inclined abutment 12 of the male connector component 10.

One engaged, the connector component or plug is securely locked to a power window actuator connector body, for example thus preventing accidental dislocation of electrical contact established thereby regardless of vibrations and slamming of a door. The connection can be easily disengaged by pressing down the tab end of the resilient arm to unlock the connection. By adding a proper and locked engagement of connector components for power window regulators or actuators necessity for removing upholstery or door trim and panel trim is avoided. This results in a saving of time and money as well as inconvenience for customers who are satisfied with their power accessories.

While the embodiments of the present invention herein disclosed constitute preferred forms, it is to be understood that other forms might be adopted.

What is claimed is as follows:

1. A safety connection, comprising, a male connector component of insulating material having a rib extending longitudinally along one outer side thereof for a predetermined distance, a female connector component of insulating material having a shoulder centrally thereof as well as a longitudinal channel portion transversely cut-out though complementary to said rib at least partly thereof, a resilient fastening means including a primary mounting portion that straddles said female connector component with said shoulder thereof being engaged by said primary mounting portion and including a resilient projecting portion integral with a V-shaped end bent transversely inwardly at a location coinciding with said cut-out of said channel portion, and an inclined abutment carried by said male connector component in a location longitudinally complementary to said rib and said channel portion though located in spaced relation axially to one side of said rib with a transverse groove therebetween, said V-shaped end when located in said cut-out of said channel portion of said female connector component and said transverse groove between said rib and said inclined abutment having an alignment outwardly of each other for interlock engagement of said V-shaped end therebetween.

2. The connection of claim 1 wherein said primary mounting portion of said fastening means includes ends on each of opposite sides thereof extending transversely of said female connector component along a side remote from said V-shaped end in said cut-out of said channel portion.

3. The connection of claim 1 wherein said female connector component has a plurality of recesses to aid in gripping thereof particularly when said V-shaped end is being disengaged from said groove between said rib and said inclined abutment.

References Cited by the Examiner

UNITED STATES PATENTS

| | | | |
|---|---|---|---|
| 1,874,334 | 8/32 | Nero | 339—75 X |
| 2,386,177 | 10/45 | Andersen | 339—91 X |
| 2,619,515 | 11/52 | Doane | 339—94 |
| 2,701,867 | 2/55 | Obenschain et al. | 339—91 X |
| 2,748,362 | 5/56 | Andis | 339—91 X |
| 2,916,720 | 12/59 | Steans | 339—91 |
| 2,982,586 | 5/61 | Gliebe | 287—119 X |
| 3,017,598 | 1/62 | Low | 339—75 |
| 3,146,051 | 8/64 | Woofter et al. | 339—91 X |

FOREIGN PATENTS 921,565   3/63   Great Britain.

JOSEPH D. SEERS, *Primary Examiner.*